Aug. 26, 1969   F. G. STEWART   3,463,525
SECURING SAFETY EQUIPMENT TO RAILROAD CARS
BY MEANS OF A BLIND HOOK BOLT
Filed April 26, 1968   2 Sheets-Sheet 1

INVENTOR
FREDERICK G. STEWART

BY Brown, Critchlow, Flick & Peckham
ATTORNEYS.

Aug. 26, 1969          F. G. STEWART                3,463,525
            SECURING SAFETY EQUIPMENT TO RAILROAD CARS
                BY MEANS OF A BLIND HOOK BOLT
Filed April 26, 1968                        2 Sheets-Sheet 2
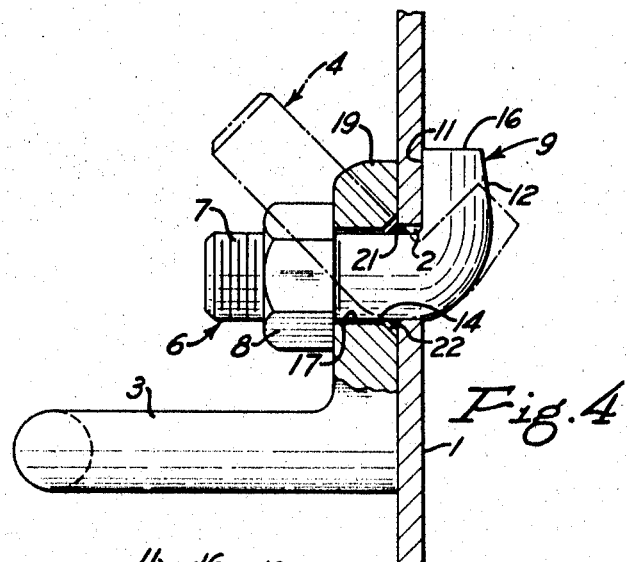
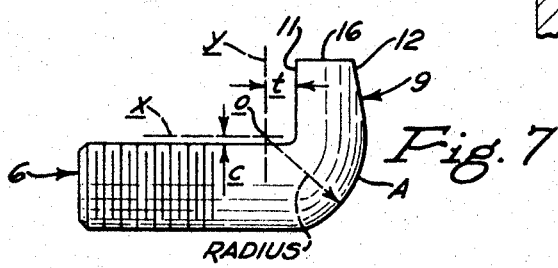
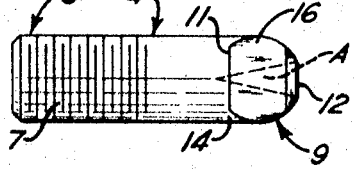
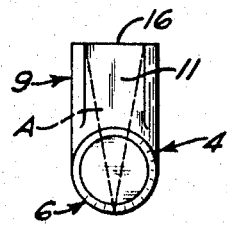
INVENTOR
FREDERICK G. STEWART
BY *Brown, Critchlow, Flick & Peckham*
                        ATTORNEYS.

United States Patent Office 3,463,525
Patented Aug. 26, 1969

3,463,525
SECURING SAFETY EQUIPMENT TO RAILROAD CARS BY MEANS OF A BLIND HOOK BOLT
Frederick G. Stewart, Washington, D.C., assignor to Schaefer Equipment Company, Pittsburgh, Pa., a corporation of Pennsylvania
Continuation-in-part of application Ser. No. 613,340, Feb. 1, 1967. This application Apr. 26, 1968, Ser. No. 724,581
Int. Cl. F16b 1/00, 39/00, 45/00
U.S. Cl. 287—189.36
2 Claims

ABSTRACT OF THE DISCLOSURE

Securing safety equipment, such as grab irons or ladders, to the outside of a side or end wall of a railroad car, where access is limited to the exterior of the car, and involves the use of a blind hook bolt that can be rockingly inserted head first in a circular hole in the car wall, the bolt being retained therein when in operative position and resisting rotation relative to the wall when a mating threaded element is tightened on the bolt.

This application is a continuation-in-part of the copending application of the same inventor and assigned to the same assignee, Ser. No. 613,340, filed Feb. 1, 1967, for blind bolt, now abandoned.

Background of the invention

The present invention is particularly useful where the workman installing safety equipment on railroad cars has convenient access to only the outside of the car, as where the side or end wall of the car is lined on the inside with wood, steel, or other material. A conventional bolt cannot be inserted in such a wall for attaching articles to the outside unless the interior lining is first penetrated or removed and the bolt inserted from the inside. In accordance with the present invention, grab irons, ladders, and other equipment can be bolted on the outside of the railroad car without the workman ever going inside the car to disturb the interior car lining and appurtenances.

One of the disadvantages of using blind bolts available in the prior art, for the purpose stated above, is that such bolts tend to turn, relative to the structural member in which they are inserted, when a mating threaded element is tightened on the bolt. Conventional means to avoid rotation are both inconvenient and expensive. For example, the suggestion has been made in Wiley Patent No. 1,915,353 to insert a bolt with a grooved shank into a complementarily tongued noncircular bolt hole to prevent rotation of the bolt in the hole; but such irregular holes are not essentially bored, nor are grooved shanks easily formed. Another disadvantage of conventional blind bolts is that they require oversize holes for inserting the head of the bolt, resulting in excess clearance around the shank of the bolt that is difficult to seal.

It is accordingly an object of the present invention to provide, in the combination of a railroad car having metal walls and an item of safey equipment, such as a grab iron, ladder or the like, a blind bolt that can be inserted head first into a circular hole of minimum diameter, that can be easily sealed, and that will resist rotation relative to the member through which it is inserted when a nut is tightened on the bolt.

Summary of the invention

In the combination of a railroad car and an item of safety equipment, referred to above, the blind hook bolt of the present invention has a substantially straight cylindrical shank that is threaded at one end and provided at the other end with an elongated head integral with the shank but extending to one side thereof, so that the shank and head together form an L-shaped bolt. The underside of the bolt head is flattened and the opposite side thereof is partially flattened and tapered, so that in a plane containing the longitudinal axes of the shank and head the latter will have a thickness less than the diameter of the shank to permit the bolt to be rockingly inserted head first through a circular hole of minimum diameter in the car wall. Means are provided for externally sealing the clearance space between the bolt shank and the edge of the hole; and other, or preferably the same, means also prevent rotation of the bolt when a mating threaded element is tightened thereon. In addition, the base of the safety equipment item may be counterbored to receive the external sealing means, thereby to permit the base to be mounted flush with the car wall.

Brief description of the drawings

A preferred embodiment of the invention is illustrated in the attached drawings, in which

FIGS. 4–6 are similar views, respectively, of a modified form of the invention; and FIG. 7 is an isolated side view of the bolt shown in FIG. 4.

Brief description of the invention

Figure 1:
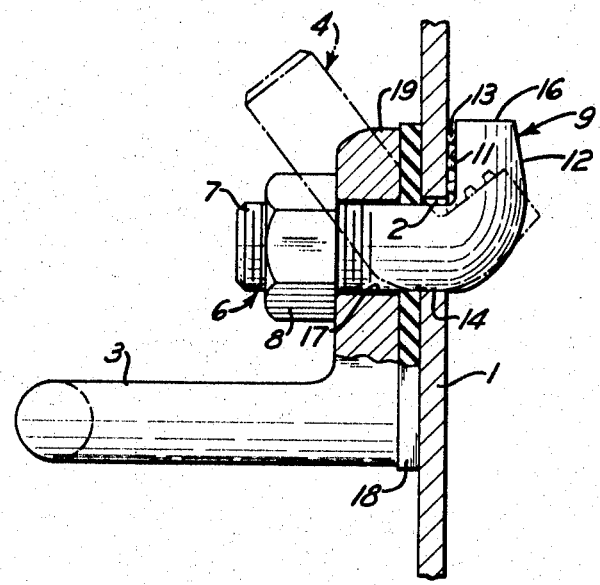
FIG. 1 is a fragmentary elevation, partly in section, of a grab iron secured by a blind hook bolt to the outside wall of a railroad car.

Referring to the drawings, a plate-like member 1 represents a fragmentary portion of the side wall of a freight car. This side wall is pierced by a circular hole 2. A grab iron 3 represents a typical item of safety equipment, for the purpose of illustration, that is to be secured to the outside of the wall (the left side of FIGS. 1 and 4) by a blind hook bolt inserted from the outside.

Figure 2:
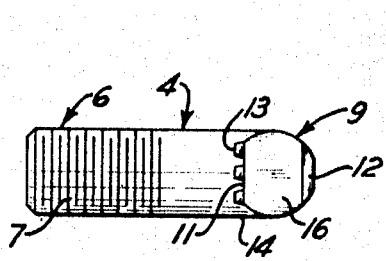
FIG. 2 is an isolated plan view of the bolt shown in FIG. 1.
Figure 3:
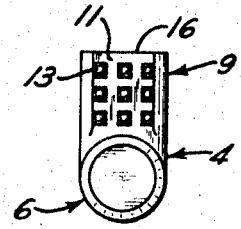
FIG. 3 is an isolated end view of the same bolt.

The bolt 4 is generally L-shaped and is preferably made from a single cylindrical blank. The bolt includes a straight shank portion 6, one end of which is provided with machine threads 7 for receiving a nut 8. Integral with the other end of the shank is an offset head 9 that extends to one side only of the shank and at right angles thereto. The maximum width or diameter of the head is desirably equal to or less than the diameter of the shank, but the head has a flattened underside 11, and a partially flattened and tapered top side 12. In one form of the invention (FIGS. 1–3), the underside of the head is provided with serrations or teeth 13; in another form (FIGS. 4–7), the underside is smooth.

The maximum cross section of the head 9, and of the adjacent portion 14 of the shank, is less than the diameter of the hole 2, so that the bolt can be inserted head first through the hole from the outside of the wall 1. The insertion is made by initially holding the bolt with the shank parallel, or nearly so, to the front of the wall, permitting the outer end 16 of the head 9 to pass through the hole. When the head has been inserted as far as it will go with the shank in this position, the bolt is tilted or rocked towards its operative position, in which the longitudinal axis of the shank is generally normal to the diametral plane of the hole. The bolt is shown in broken lines in FIGS. 1 and 4 approximately half way between its initial inserting position and its final operative position, the latter being shown in full lines. In order that the bolt may be easily inserted in the hole 2 and that this hole may have a minimum diameter for a given bolt shank diameter, not only are the underside 11 and opposite side 12 of the bolt head flattened and tapered as shown; but also the outer curved surface of the bend between head and shank is preferably taperingly flattened over the area A shown in broken lines in FIG. 5. Such flattening of the outside curved surface between head and shank decreases the effective tilting radius of the bolt during its insertion in the hole.

After the bolt has been inserted in the car wall as described above, its threaded shank portion may be passed through a hole 17 in the grab iron 3 and the latter secured in place by nut 8. Various means may be provided to seal the clearance space between the shank of the bolt and the edge of the hole in the car wall. For example, as shown in FIG. 1, a gasket 18 of resilient material may be inserted between the base 19 of the grab iron and the car wall to prevent moisture from passing through the hole 2. Until the nut begins to tighten, the bolt is held against rotation manually. As soon as the nut begins to tighten, however, it will draw the bolt outward and cause the serrations 13 to bite into the inside surface of wall 1, effectively preventing the bolt from rotating relative to the wall. The more the nut is tightened, the greater will be the resistance of the bolt to turning.

In the form of the invention shown in FIGS. 4–7, in which the underside of the head is smooth, a weld 21 is formed continuously around the edge of the hole and the bolt shank, both to seal the clearance space and to prevent the bolt from turning. This form of seal will generally be preferred, except in those cases where the heat of welding involves a risk of possible damage to the interior lining of the car wall. In such cases, the gasket and bolt with serrated head shown in FIG. 1 can be used, or a conventional O-ring (not shown) can replace the weld. In the latter case, the O-ring tends to be wedged between the side of the hole and the bolt shank when the nut is tightened in the bolt, thereby preventing rotation of the bolt so that the underside of the bolt head need not be serrated, as well as sealing the clearance space. Since the weld and O-ring project outwardly beyond the surface of the car wall, it is desirable to provide a counterbore 22 in the base 19 of the grab iron (or other item of safety equipment) to receive the lump of the weld or to receive and compress the O-ring, in either case permitting the base to rest flush against the car wall.

Reference has been made herein to taperingly flattening the outer curved surface of the bend between head and shank over the area A shown in broken lines in FIG. 5. The amount of such flattening required to permit the insertion of a bolt in a hole of minimum diameter can be more precisely determined in accordance with the following geometric conditions. The bolt of FIG. 4 is shown in its operative position with the bottom of the shank portion resting against the bottom edge of the hole in the car wall. This leaves a maximum clearance space between the top portion of the shank and the upper edge of the hole immediately adjacent the flat underside of the bolt head. Assuming that this maximum clearance space has a dimension $c$, a line $x$ is drawn in FIG. 7 parallel to the longitudinal axis of the shank portion of the bolt and spaced from the shank portion by the distance $c$. This line lies in a plane containing both the longitudinal axis of the bolt shank and that of the bolt head and is on the side of the bolt on which the head projects. A second line $y$ is shown in the same plane parallel to the flat underside of the bolt head and spaced from that underside by a distance $t$ substantially equal to the thickness of the car wall at the edge of the hole. These two lines intersect at a point $o$. Using this point as a center, the curvature of the outer surface A of the bend between head and shank is substantially described by an arc having a radius equal in length to the diameter of the bolt plus the clearance distance $c$. A hook bolt substantially satisfying these geometric conditions can be rockingly inserted in the hole of minimum diameter in the car wall.

According to the provisions of the patent statutes, I have explained the principle of my invention and have illustrated and described what I now consider to represent its best embodiment. However, I desire to have it understood that the invention may be practiced otherwise than as specifically illustrated and described.

I claim:

1. In the combination of a metal wall having a circular hole therein and an item of safety equipment, such as a grab iron, ladder, or the like, having a base mountable on the outside of the wall, the improvement comprising: a blind hook bolt having a substantially straight cylindrical shank that is threaded at one end and provided at the other end with an elongated head integral with the shank but extending to one side thereof and at right angles thereto so that the shank and head together form an L-shaped bolt, the underside of the head being flattened and the opposite side thereof being partially flattened adjacent the free end thereof so that in a plane containing the longitudinal axes of the shank and head the latter will have a thickness less than the diameter of the shank to permit the bolt to be rockingly inserted head first through the circular hole in the wall, the hole having a diameter of minimum clearance for receiving the head, and means for externally sealing the clearance space between the bolt shank and the edge of the hole and for preventing rotation of the bolt in the hole when a mating threaded element is tightened thereon, the base of the safety equipment item being counterbored to receive said external sealing means to permit the base to be mounted flush with the wall, wherein the shank and head include an outside convex curvature in the region where the two join and in a plane containing the longitudinal axes of the shank and the head, the convex curvature being substantially described by an arc having a center that lies at the intersection of a first line parallel to the longitudinal axis of the bolt shank and spaced from the shank a distance substantially equal to the maximum clearance in said clearance space and of a second line parallel to the flat underside of the head and spaced therefrom a distance substantially equal to the thickness of the wall adjacent the edge of the hole, both of said lines lying in said plane, and said arc having a radius substantially equal in length to the diameter of the bolt shank plus said maximum clearance.

2. The combination of claim 1, in which said means for sealing the clearance space and for preventing rotation of the bolt includes a continuous weld between the shank of the bolt and the edge of the hole.

References Cited

UNITED STATES PATENTS

| | | | |
|---|---|---|---|
| 940,739 | 11/1909 | Schlussler. | |
| 1,050,279 | 1/1913 | Joseph | 248—304 X |
| 1,210,595 | 1/1917 | Brubaker. | |
| 1,358,688 | 11/1920 | Lyon. | |
| 1,955,353 | 4/1934 | Wiley | 85—9 |
| 2,202,405 | 5/1940 | Smith | 151—41.7 X |
| 2,379,752 | 7/1945 | Schultz | 287—20.5 |
| 2,411,629 | 11/1946 | Lane. | |

RAMON S. BRITT, Primary Examiner

U.S. Cl. X.R.

85—9; 151—41.7; 248—304